(12) United States Patent
Konishi et al.

(10) Patent No.: US 7,017,726 B2
(45) Date of Patent: Mar. 28, 2006

(54) ELECTROMAGNETIC CLUTCH

(75) Inventors: Toshihiro Konishi, Kariya (JP); Toshihiro Hayashi, Chiryu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/737,840

(22) Filed: Dec. 18, 2003

(65) Prior Publication Data
US 2004/0188217 A1   Sep. 30, 2004

(30) Foreign Application Priority Data
Mar. 24, 2003   (JP)   ............................. 2003-081487

(51) Int. Cl.
*F16D 27/112*   (2006.01)
(52) U.S. Cl. .................... 192/84.961; 464/31
(58) Field of Classification Search .......... 192/84.94, 192/84.941, 84.961, 84.96, 109 R; 464/31, 464/32
See application file for complete search history.

(56) References Cited

U.S. PATENT DOCUMENTS

| | | | |
|---|---|---|---|
| 3,205,989 A | | 9/1965 | Mantey |
| 3,774,739 A | * | 11/1973 | Higuchi ................. 192/84.941 |
| 4,445,606 A | * | 5/1984 | Van Laningham ..... 192/84.961 |
| 4,493,407 A | * | 1/1985 | Newton ................. 192/84.941 |
| 5,909,787 A | | 6/1999 | Kubo |
| 5,944,158 A | * | 8/1999 | Okazaki ................ 192/84.961 |
| 6,209,699 B1 | | 4/2001 | Hayashi et al. |

FOREIGN PATENT DOCUMENTS

| | | |
|---|---|---|
| JP | A-08-135686 | 5/1996 |
| JP | A-2000-161389 | 6/2000 |

OTHER PUBLICATIONS

Search Report issued from French Patent Office mailed on Sep. 1, 2005 for the corresponding French patent application No. 0400238000.

* cited by examiner

*Primary Examiner*—Rodney H. Bonck
(74) *Attorney, Agent, or Firm*—Posz Law Group, PLC

(57) ABSTRACT

In the disclosed electromagnetic clutch, a bent porion (15a) of a plate (15) comes into contact with an armature (6) attempting to move beyond a predetermined movable range, thereby restricting the movement of the armature (6). As a result, if an elastic member (14) is fused, a trouble is prevented which otherwise might be caused by the movement of the now-unsupported armature (6) beyond a predetermined movable range.

17 Claims, 8 Drawing Sheets

ELECTROMAGNETIC CLUTCH

BACKGROUND OF THE INVENTION

1. Field of the Invention

The present invention relates to an electromagnetic clutch, for transmitting and interrupting a rotational driving force, suitably used to interrupt the operation of a compressor of an air conditioning system of an automobile, etc.

2. Description of the Prior Art

A conventionally known technique for an electromagnetic clutch is disclosed in Japanese Unexamined Patent Publication No. 2000-161389. FIG. 9 is a sectional view of such an electromagnetic clutch 101. In FIG. 9, the left side in the drawing is designated as the front side and the right side in the drawing as the rear side of the electromagnetic clutch 101.

The electromagnetic clutch 101 is mounted on a compressor 110 through an annular support member 109 and comprises an electromagnetic coil 103 built in a stator 102, a rotor 104 freely rotatable around the electromagnetic coil 103, a pulley 114 rotated integrally with the rotor 104 for transmitting the power from the engine not shown, an armature 105 adapted to be attracted to the rotor 104 by the magnetic force generated in the electromagnetic coil 103 and a cylindrical hub 106 adapted to rotate with the armature 105.

The hub 106 is connected to a leaf spring member 111 by a rivet 113. The rear side of the leaf spring member 111 is bonded to the front side of an elastic member 107 by baking. The rear side of the elastic member 107, on the other hand, is bonded to the front side of the armature 105 by baking. The hub 106 is integrally fitted in the rotational direction of a rotary shaft 108 of the compressor by a bolt 112.

The armature 105, which is arranged in an opposed relationship, with a predetermined minuscule gap therebetween, with the friction surface of the rotor 104, is formed of an annular magnetic material such as iron. The rear side of the elastic member 107 is bonded by baking to the front side of the armature 105. By the elastic deformation of the leaf spring member 111, bonded by baking to the front side of the elastic member 107, the armature 105 and the elastic member 107 can be moved along the axial direction of the rotary shaft 108, so that when current flows in the electromagnetic coil 103, the armature 105 is attracted to the rotor 104 by the magnetic force of the electromagnetic coil 103. The impact sound generated at this time by the collision between the friction surfaces of the armature 105 and the rotor 104 is absorbed by the elastic member 107.

Also, once the compressor 110 is "locked", by foreign matter or otherwise, the armature 105 connected to the hub 106 integrally rotating with the rotary shaft of the compressor 110 also ceases to rotate, and heat is generated by fiction with the rotor 103 still continuing to rotate. This heat is transmitted through the armature 105 to the elastic member 107. As a result, the elastic member 107 is fused, and the armature 105 is separated from the members of the compressor 110 such as the leaf spring member 111, the hub 106 and the rotary shaft 108 which are stopped by the locking of the compressor 110. In this way, the troubles such as a belt being broken or the temperature being abnormally increased due to a protracted overloaded state can be prevented. In other words, the electromagnetic clutch 101 has also the function of a torque limiter.

In the case where the compressor 110 is locked due to foreign matter or otherwise, the torque limiter mechanism of the electromagnetic clutch works to separate the armature 105 from the rotary shaft 108. In the process, the elastic member 107 that has thus far supported the armature 105 is fused. Therefore, the armature 105 is left supported while being attracted to the rotor 104 by the magnetic field generated in the electromagnetic coil 103. As a result, the armature 105 moves in a radial direction by means of a centrifugal force, and this may cause an abnormal noise to be generated by the contact with a rotating inner hub 115.

In the case where the rivet 113 is broken by the overload torque imposed on the electromagnetic clutch 101 before the elastic member 107 is fused by the locking of the compressor 110, the armature 105 moves axially toward the front side of the electromagnetic clutch 101 and may come off.

SUMMARY OF THE INVENTION

This invention has been developed in view of the above-mentioned situation, and the object thereof is to provide an electromagnetic clutch capable of preventing an abnormal sound or other troubles which may be caused by the movement of the armature 105 in radial or axial direction beyond a predetermined movable range at the time of a malfunction.

In order to achieve the object described above, according to a first aspect of the invention, there is provided an electromagnetic clutch comprising restriction means (15a, 20, 18, 15b, 7d) for restricting the radial movement of the armature (6) when it is disconnected from the hub (7).

In this aspect of the invention, preferably, the movement of the armature (6) in the radial direction is restricted by bringing a part (15a, 15b) of a plate (15) into contact with the armature (6).

In this aspect of the invention, preferably, the movement of the armature (6) in the radial direction is restricted by bringing a part of mounting means (18) into contact with the armature (6).

In this aspect of the invention, preferably, the movement of the armature (6) in the radial direction is restricted by bringing a part (7d) of a hub (7) into contact with the armature (6).

As described above, according to this invention, the provision of the restriction means (15a, 20, 18, 15b, 7d) for restricting the movement of the armature (6) in the radial direction thereof prevents the armature (6) moving beyond a predetermined movable range when disconnected from the hub (7).

According to another aspect of the invention, there is provided an electromagnetic clutch comprising restriction means (15a, 6a, 7a) for restricting the movement of the armature (6) along the axis of the hub (7) when disconnected with the hub (7).

In this aspect of the invention, the hub (7) includes a flange portion (7a) having the outer diameter larger than the inner diameter of a part (15a) of a plate (15), and the movement of the armature (6) along the axis of the hub (7) is restricted by bringing a part (15a) of the plate (15) into contact with the flange portion (7a).

In this aspect of the invention, the outer diameter of the flange portion (7a) is larger than the inner diameter portion (6a) of the armature (6), and the movement of the armature (6) along the axis of the hub (7) is restricted by bringing the flange (7a) into contact with the inner diameter portion (6a) of the armature (6).

As described above, according to this invention, the provision of the restriction means (15a) for restricting the movement of the armature (6) along the axis of the hub (7) prevents the armature (6) moving beyond a predetermined movable range when disconnected with the hub (7).

The reference numerals in the parentheses attached to the component parts described above designate an example of correspondence with the specific means described in the embodiments of the invention described later.

The present invention may be more fully understood from the description of preferred embodiments of the invention, as set forth below, together with the accompanying drawings.

DESCRIPTION OF THE PREFERRED EMBODIMENTS (First Embodiment)

Figure 1:
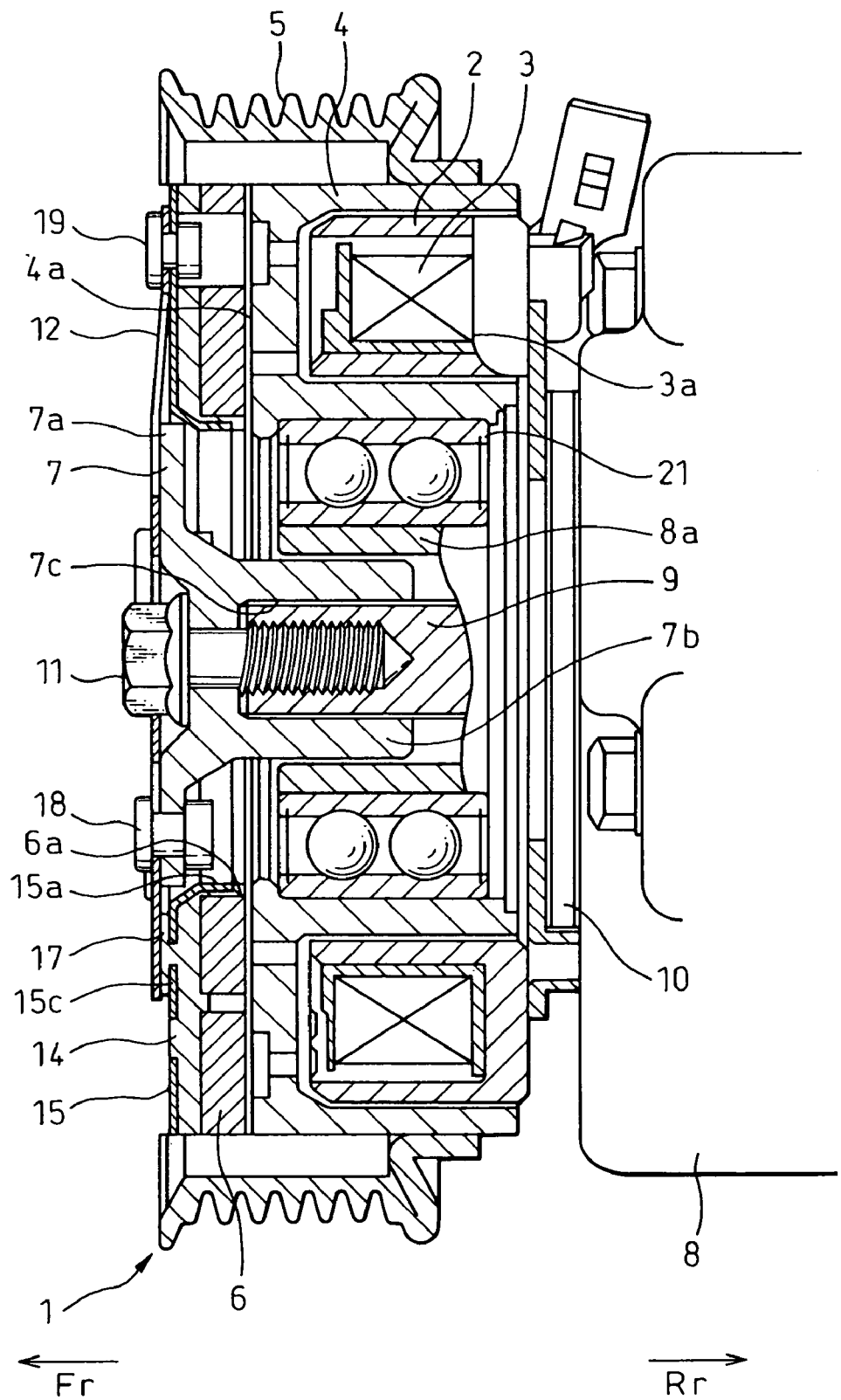
FIG. 1 is a sectional view of an electromagnetic clutch according to a first embodiment of the invention.
Figure 2:
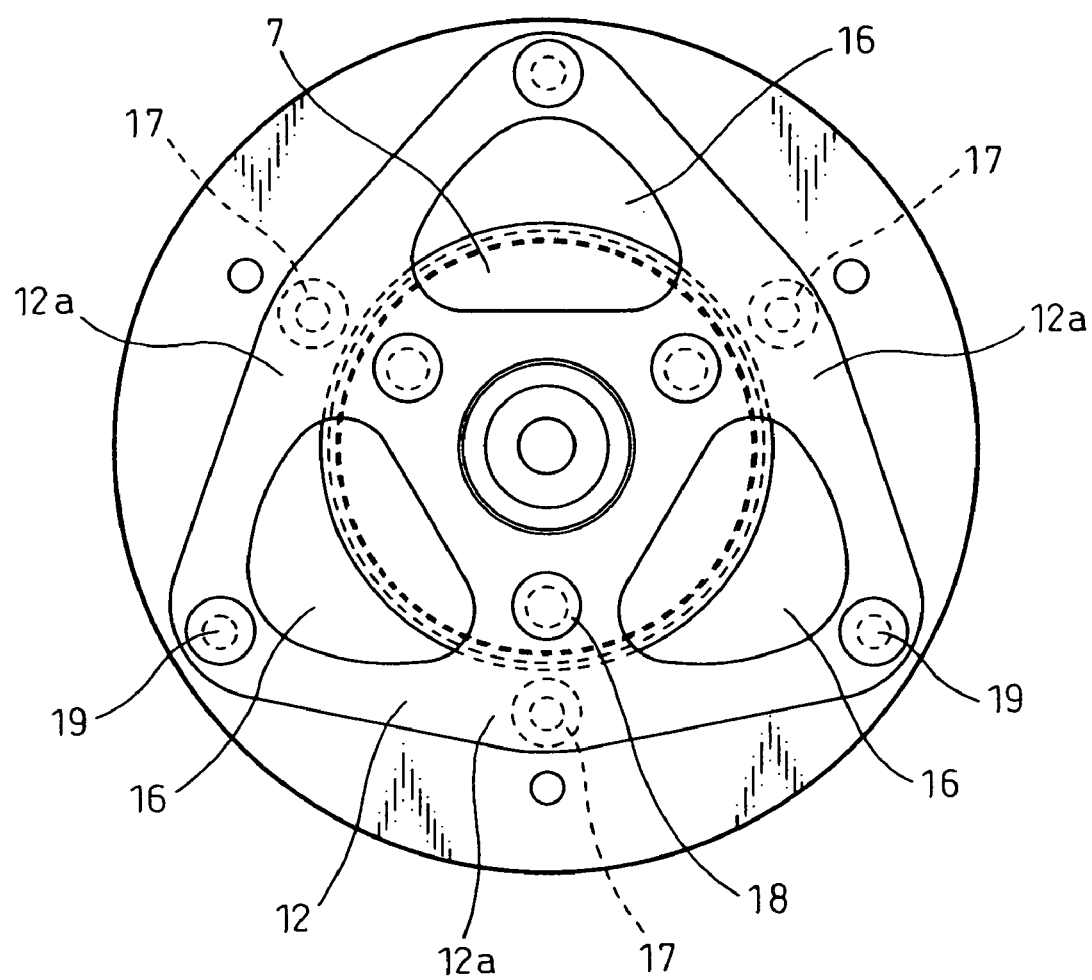
FIG. 2 is a diagram showing the connection of a hub 7 with a leaf spring member 12, a plate 15, an elastic member 14 and an armature 6 as viewed from the front side according to the first embodiment of the invention.

FIGS. 1 and 2 are diagrams showing a first embodiment, in which FIG. 1 is a partly cutaway sectional view of an electromagnetic clutch 1, mounted on a refrigerant compressor 8 (hereinafter referred to as the compressor) for the refrigeration cycle of an automotive air conditioning system, for interrupting the power from a drive source. In the description that follows, the surface of the electromagnetic clutch 1 viewed from the left side in FIG. 1 is referred to as the front side, and the surface thereof viewed from the right side in FIG. 1 as the rear side of the electromagnetic clutch 1.

The electromagnetic clutch 1 is configured mainly of an electromagnetic coil 3, a rotor 4, an armature 6 and a hub 7.

The electromagnetic coil 3 is fixed on a compressor 8 through an annular support member 10, and accommodated in a stator 2 formed of a magnetic material such as iron having a V-shaped cross section. Also, the electromagnetic coil 3 is wound around a resin bobbin 3a and fixedly molded and electrically insulated using an insulating resin material such as epoxy resin.

The rotor 4 has a bearing 21 on the inner peripheral portion thereof and is rotatably supported on the outer peripheral surface of a cylindrical boss 8a of the housing of the compressor 8 by the bearing 21. The rotor 4 constitutes a drive-side rotary member for receiving the turning effort from the vehicular engine (not shown) providing a drive source. The rotor 4 has a pulley 5 with a V-belt (not shown) suspended on the outer peripheral portion thereof, and is rotated by the turning effort of the engine transmitted thereto through the V-belt. Also, the rotor 4 is formed of a magnetic material such as iron, and formed with a U-shaped cross section in slightly spaced relation with the stator 2.

The armature 6 is formed as a disk of a magnetic material such as iron. In the deenergized state of the electromagnetic coil 3, the end surface on the rear side of the armature 6 is arranged in opposed relation, with a minuscule gap (say, about 0.5 mm) therebetween, to the friction surface 4a of the rotor 4, and is attracted to the friction surface 4a of the rotor 4 by the magnetic force generated in the electromagnetic coil 3 accommodated in the rotor 4. The rear side of the elastic member 14 is bonded by baking to the front side of the armature 6 and, further is connected to the leaf spring member 12 through the plate 15 (described later) bonded by baking to the front side of the elastic member 14. The function of the spring portion 12a of the leaf spring member 12 makes it possible for the armature 6 to move only a predetermined amount along the axis of the rotary shaft 9 integral with the elastic member 14 and the plate 15.

The hub 7 has an inner hub 7b formed, cylindrically, of an iron metal. A spline fitting portion 7c is formed on the inner peripheral surface of the cylindrical portion of the inner hub 7b, and the hub 7 is integrally fitted with the rotary shaft 9 by the spline fitting portion 7c. The hub 7 is integrally molded with a mounting flange portion 7a extending radially outward of an end along the axis of the cylindrical portion of the inner hub 7b. This hub 7 is connected to the rotary shaft 9 of the refrigerant compressor 8 providing a driven unit, and has the function of transmitting the turning effort of the rotor 4 and the rotating armature 6 to the compressor 8 when the armature 6 is attracted to the friction surface 4a of the rotor 4.

The elastic member 14 is a disc with a hole formed in the central portion thereof, and is held between, and bonded by baking to, the rear side of a disc plate 15 with a hole formed in the central portion thereof and the front side of the armature 6. The rubber material used for the elastic member 14 preferably exhibits superior characteristics of torque transmission and torque variation absorption (vibration attenuation) in the wide temperature range (−30° C. to 120° C.) of the automotive operating environment. Specifically, butyl rubber chloride, acrylonitrile, butadiene rubber, ethylene propylene rubber or the like is recommended.

Figure 6:
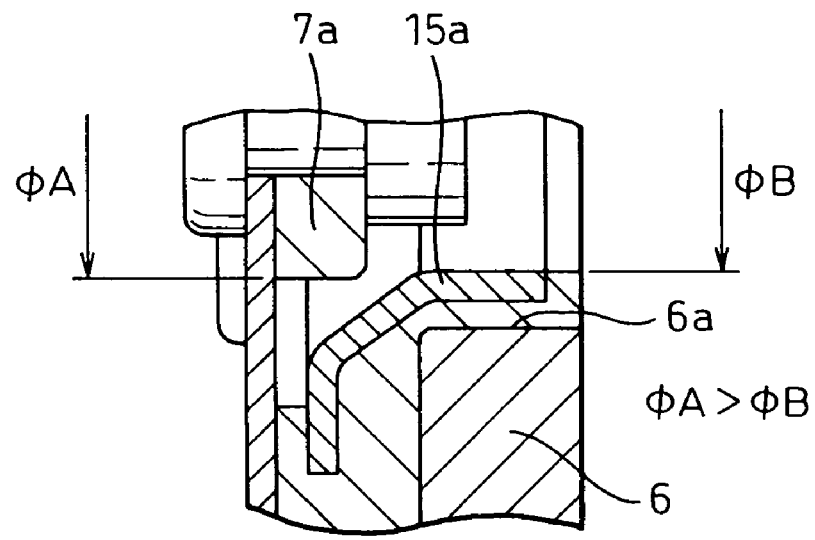
FIG. 6 is an enlarged view of FIG. 1 showing the relation between the outer diameter $\phi A$ of the flange portion 7a, the inner diameter $\phi B$ of the bent plate portion 15a and the inner diameter portion 6a of the armature according to the first embodiment.

A bent plate portion 15a is arranged on the inner diameter side of the plate 15, and shown in the enlarged view of FIG. 6. The bent plate portion 15a is bent to the rear side under the inner diameter portion 6a of the armature 6. Specifically, the bent plate portion 15a is formed so that the inner peripheral portion of the armature 6 extends from the front side toward the rear side.

The outer diameter $\phi A$ of the discal mounting flange portion 7a of the hub 7 is larger than the inner diameter $\phi B$ of the bent plate portion 15a.

The outer peripheral portion of the leaf spring member 12 is fixed on the plate 15 by outer rivets 19, and the inner peripheral portion thereof on the hub 7 by inner rivets 18. FIG. 2 is diagram showing the connection of the hub 7 with the leaf spring member 12 and the plate 15 as viewed from the front side. The leaf spring member 12 is substantially triangular in shape and has punched portions 16 with a spring portion 12a formed at the intermediate portion between the apexes of the triangle.

The plate 15 is formed with plate hole portions 15c, from which a part of the elastic member 14 is projected thereby to form stoppers 17. The initial displacement of the spring portion 12a is secured by bending the spring portion 12a while keeping the stoppers 17 and the outer rivets 19 in predetermined relative positions. When the electromagnetic coil 3 is deenergized, therefore, the elastic member 14 and the armature 6 connected by the leaf spring member 12 are supported at a position slightly spaced from the rotor 4 by the elastic restoration of the spring portion 12a.

(Operation of this Embodiment)

As long as the electromagnetic coil is kept deenergized, the armature 6 is arranged in an opposed relation, with a very small gap therebetween, to the friction surface 4a of the rotor 4. Even in the case where the rotor 4 is rotated by the turning effort of the engine, therefore, the armature 6 is not rotated. Thus, neither the hub 7 nor the rotary shaft 9 rotates, and the compressor 8 is not driven.

Once the electromagnetic coil 3 is energized, however, the armature 6 is attracted toward the rotor 4 by the magnetic force generated in the electromagnetic coil 3, and the spring portion 12a of the leaf spring member 12 is elastically deformed. The armature 6 is attached to the friction surface 4a of the rotor 4 and begins to rotate integrally with the rotor 4. In the process, the elastic member 14 held between the armature 6 and the plate 15 functions to alleviate the impact sound generated by the attachment of the armature 6 to the friction surface 4a of the rotor 4.

An explanation of the torque limiter function in which the transmission of the overload torque from the compressor 8 is interrupted thereby to protect the V-belt (not shown) and other engine auxiliary machines, in the case where the compressor 8 is locked by biting foreign matter or otherwise, is given below. In the case where the rotary shaft 9 ceases to rotate due to the locking of the compressor 8, the friction heat is generated between the armature 6 that is connected to the rotary shaft 9 through the hub 7 and the leaf spring member 12 and has ceased to rotate on the one hand and the friction surface 4a of the rotor 4 still continuing to be rotated by receiving the turning effort from the engine on the other hand.

This heat is transmitted to the elastic member 14 through the armature 6 and fuses the elastic member 14. Thus, the torque transmission from the plate 15 to the armature 6 is interrupted and the armature 6 is released from the rotary shaft 9 of the compressor 8. As a result, the overload thus far imposed on the electromagnetic clutch 1 is eliminated.

(Effects of this Embodiment)

The elastic member 14 that has thus far supported the armature 6, once fused by the operation of the torque limiter mechanism described above, is removed, and the armature 6 is left attached on the fiction surface 4a of the rotor 4 by the electromagnetic force generated in the electromagnetic coil 3. In such a situation, the armature 6 may tend to move in the radial direction by the centrifugal force or the like. As shown in FIG. 6, however, the bent plate portion 15a is in contact with the inner portion 6a of the armature, and therefore the armature 6 is prevented from moving further in the radial direction. As a result, abnormal noise or other troubles, which otherwise might be caused as the armature 6 is moved in the radial direction without being supported and the armature 6 comes into contact with the rotating inner hub 7b after the operation of the torque limiter mechanism, are prevented.

In the case where the leaf spring member 12 or the inner rivets 18 are broken under the overload torque, on the other hand, the plate 5, the elastic member 14 and the armature 6 connected to each other may move axially toward the front side and come off. As the outer diameter φA of the flange portion 7a of the hub 7 is larger than the inner diameter φB of the bent plate portion 15a, however, the tendency of the plate 15 to move axially toward the front side causes the bent plate portion 15a to come into contact with the flange portion 7a. Therefore, the movement of the plate 15 axially toward the front side is also restricted.

Further, the spring portion 12a is provided with an initial displacement by bringing the stoppers 17 into contact with the central portion of the spring portion 12a. Therefore, the spring portion 12a can be displaced uniformly about each stopper 17. Thus, the elasticity of the spring portion 12a can be utilized to the maximum degree.

(Second Embodiment)

Figure 3:
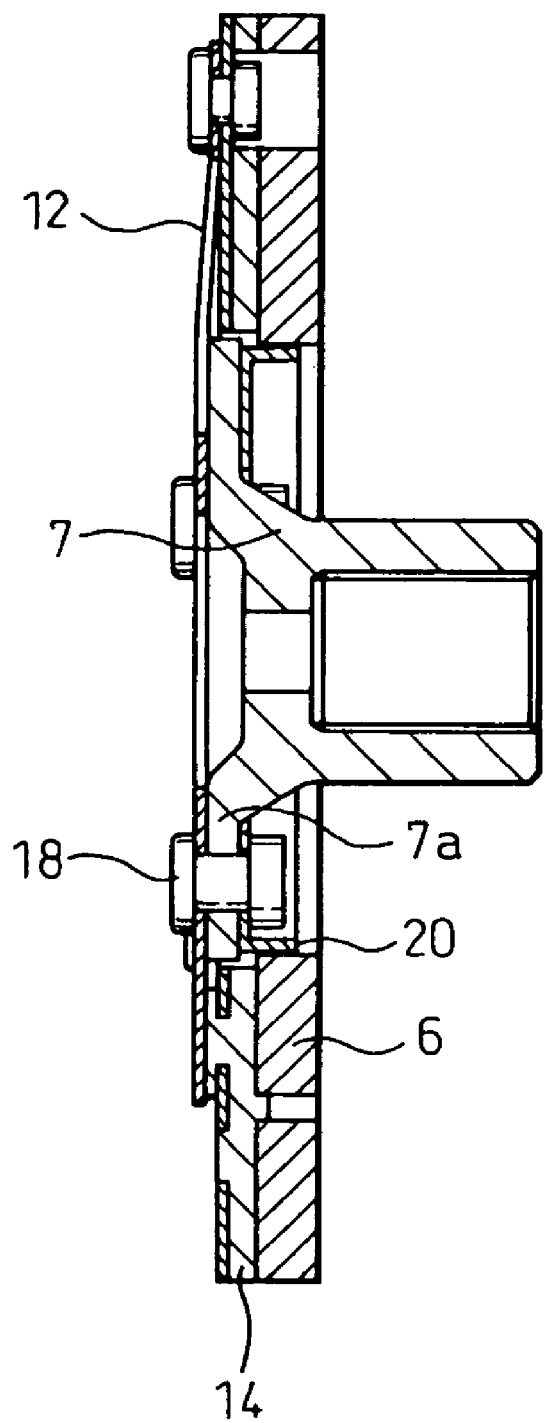
FIG. 3 is a sectional view showing the connection of a hub 7 with a leaf spring member 12, a plate 15, an elastic member 14 and an armature 6 according to a second embodiment of the invention.

FIG. 3 is a sectional view of the hub 7, the leaf spring member 12, the plate 15, the elastic member 14 and the armature 6 according to a second embodiment. Unlike in the first embodiment wherein the plate 15 is provided with the bent portion 15a, according to this embodiment, an independent restricting portion 20 is fixedly held between the rear side of the flange portion 7a of the hub 7 and the inner rivets 18. After the operation of the torque limiter mechanism, therefore, the movement of the armature 6 in the radial direction is restricted. This independent restricting portion 20, which is disc-shaped and has a hole formed in the central portion thereof, has the outer diameter portion thereof bent to contact with the inner diameter portion 6a of the armature 6.

(Third Embodiment)

Figure 4:
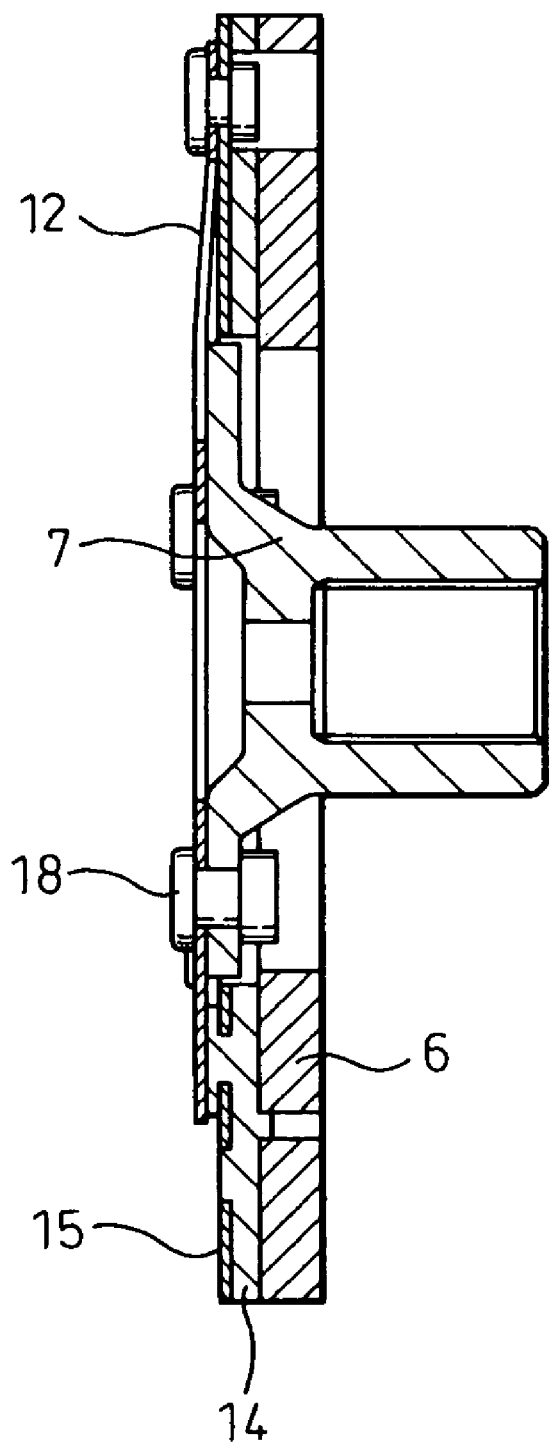
FIG. 4 is a sectional view showing the connection of a hub 7 with a leaf spring member 12, a plate 15, an elastic member 14 and an armature 6 according to a third embodiment of the invention.

FIG. 4 is a sectional view of the hub 7, the spring plate member 12, the plate 15, the elastic member 14 and the armature 6 according to a third embodiment. Unlike in the first and second embodiments, according to this embodiment, the rear side of each inner rivet 18 is so shaped that the tendency of the armature 6 to move in the radial direction causes the rear side of the inner rivets 18 to extend to a position in contact with the inner diameter portion 6a of the armature 6, thereby restricting the movement of the armature 6 in the radial direction.

(Fourth Embodiment)

Figure 5:
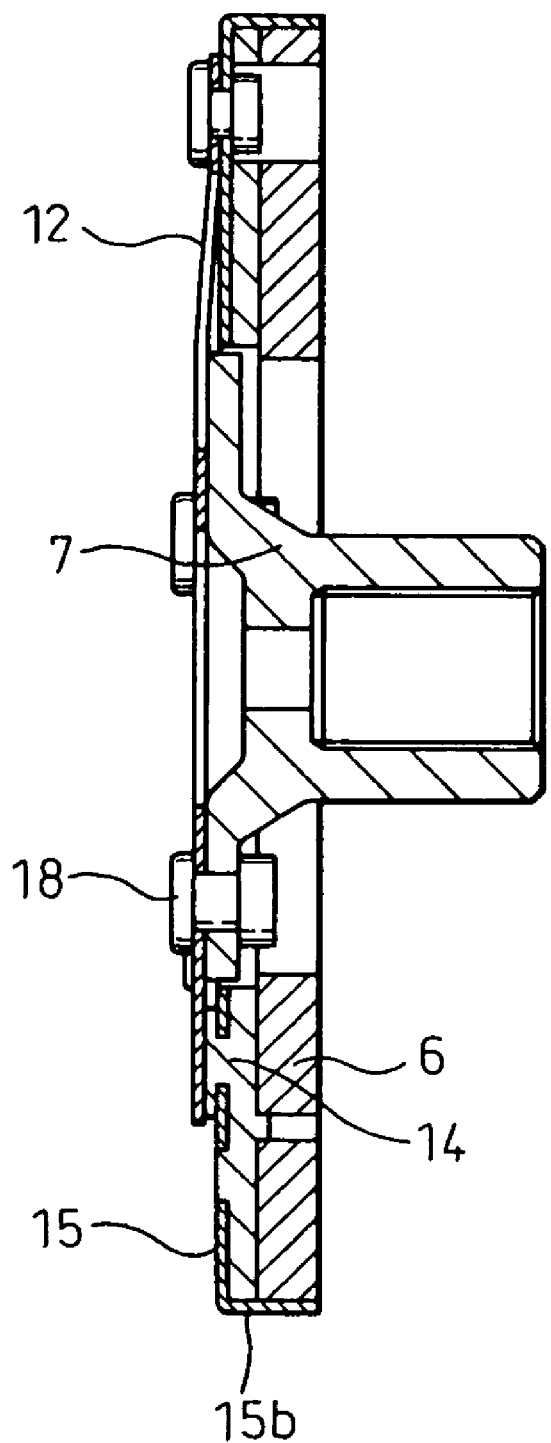
FIG. 5 is a sectional view showing the connection of a hub 7 with a leaf spring member 12, a plate 15, an elastic member 14 and an armature 6 according to a fourth embodiment of the invention.

FIG. 5 is a sectional view of the hub 7, the leaf spring member 12, the plate 15, the elastic member 14 and the armature 6 according to a fourth embodiment. According to this embodiment, the outer diameter portion 15b of the plate 15 is bent toward the armature 6, and thus restricts the movement of the armature 6 in the radial direction from the outside.

Figure 7:
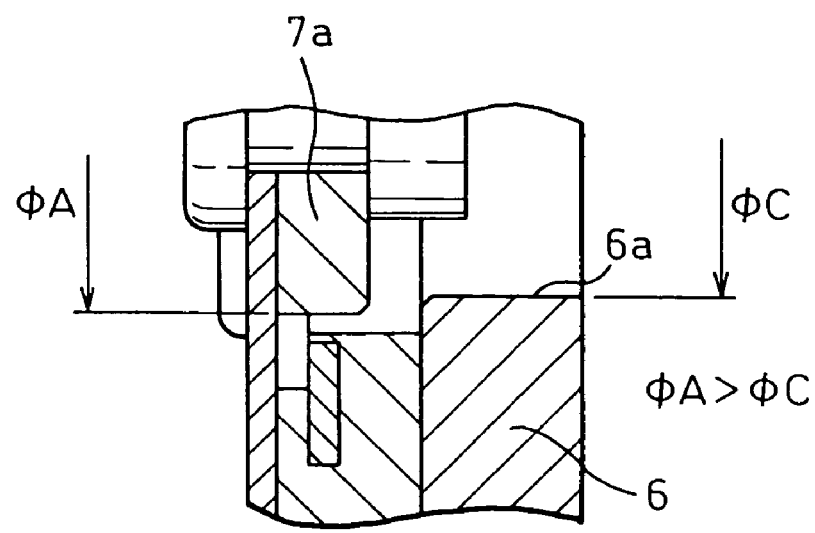
FIG. 7 is an enlarged view showing the relation between the outer diameter $\phi A$ of the flange portion 7a and the inner diameter $\phi C$ of the inner diameter portion 6a of the armature according to the second, third and fourth embodiments.

In the second, third and fourth embodiments described above, the outer diameter φA of the flange portion 7a of the hub 7 is larger than the inner diameter φC of the inner diameter portion 6a of the armature 6, as shown in FIG. 7.

In the case where the leaf spring member 12 or the inner rivets 18 are broken under an overload torque, the plate 15, the elastic member 14 and the armature connected to each other tend to move axially toward the front side and come off. As the outer diameter φA of the flange portion 7a of the hub 7 is larger than the inner diameter φC of the inner diameter portion 6a of the armature 6, however, the tendency of the plate 15 to move axially toward the front side brings the inner diameter portion 6a of the armature 6 into contact with the flange portion 7a. Thus, the axial movement of the armature 6 toward the front side is also restricted.

(Fifth Embodiment)

Figure 8:
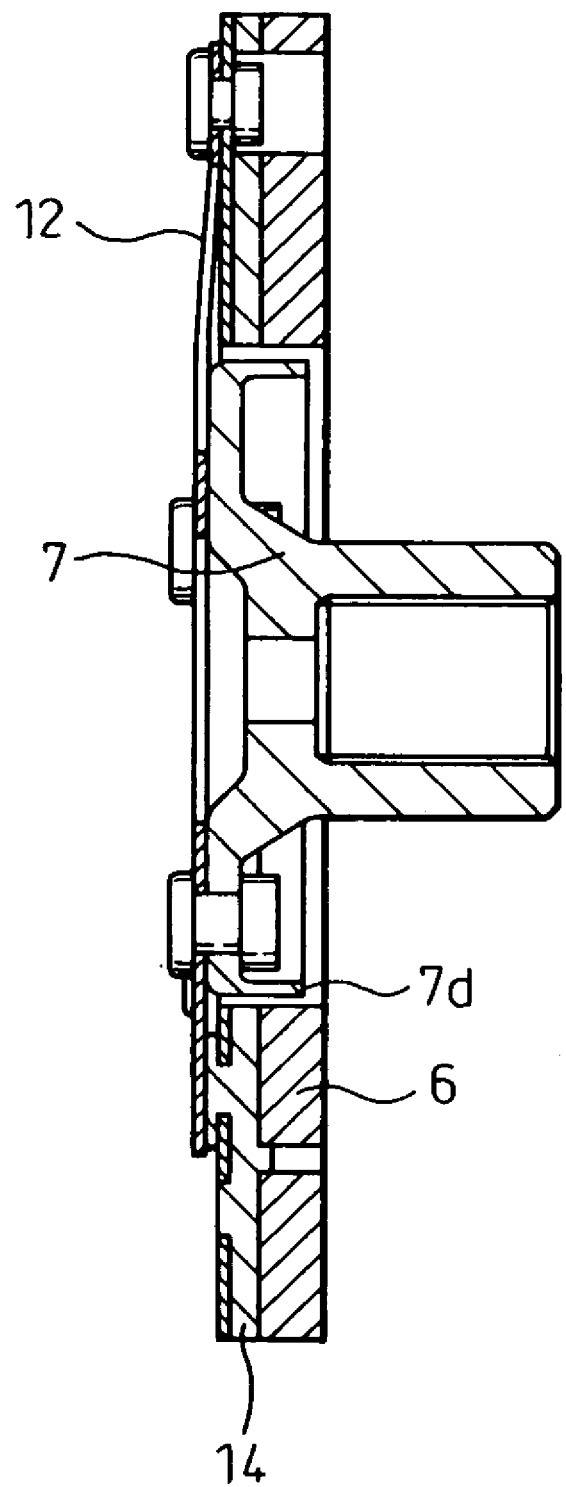
FIG. 8 is a sectional view showing the connection of a hub 7 with a leaf spring member 12, a plate 15, an elastic member 14 and an armature 6 according to a fifth embodiment of the invention.
Figure 9:
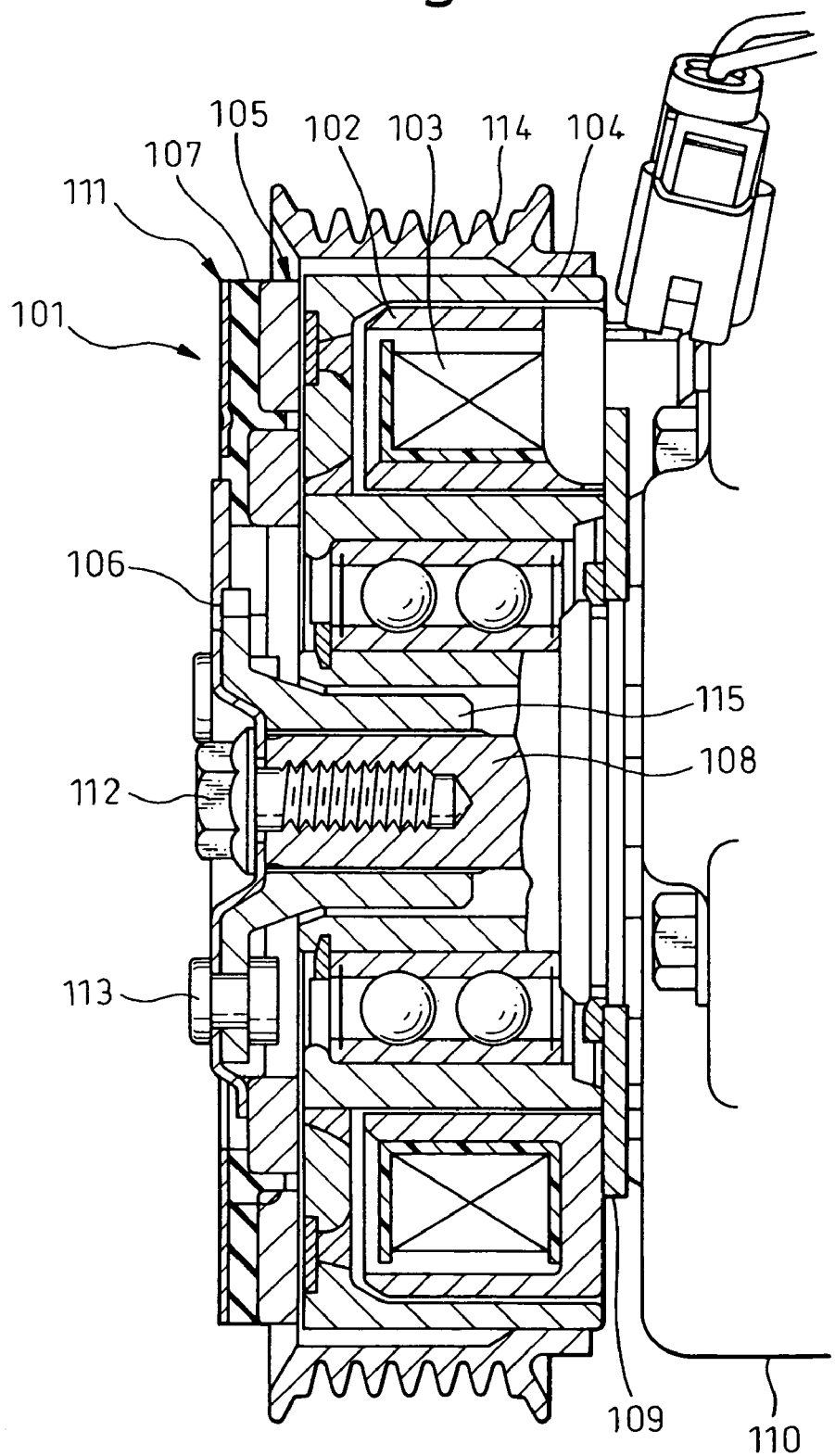
FIG. 9 is a sectional view of an electromagnetic clutch 101 according to the prior art.

FIG. 8 is a sectional view of the hub 7, the leaf spring member 12, the plate 15, the elastic member 14 and the armature 6 according to a fifth embodiment. According to this embodiment, the flange portion 7a is bent to form a bent flange portion 7d to thereby restrict the movement of the armature 6 in the radial direction.

While the invention has been described by reference to specific embodiments chosen for purposes of illustration, it should be apparent that numerous modifications could be made thereto by those skilled in the art without departing from the basic concept and scope of the invention.

What is claimed is:

1. An electromagnetic clutch comprising:
   an electromagnetic coil adapted to be energized for generating an electromagnetic force;
   a rotor rotationally driven by a drive source;
   an armature adapted to be attached to said rotor by the electromagnetic force generated by said electromagnetic coil for receiving the turning effort of said rotor;
   a hub connected to a driven unit;
   spring means connected to said hub;
   a plate connected to said spring means;
   an elastic member bonded to said armature and said plate and interposed between said armature and said plate; and
   restriction means for restricting the movement of said armature in the radial direction thereof when said armature is disconnected with said hub, said restriction means extending axially toward said armature,
   said plate, said elastic member, and said armature being disposed so as to be axially stacked,
   wherein the movement of said armature in the radial direction is restricted by keeping a part of said plate in contact with said armature.

2. An electromagnetic clutch according to claim 1, wherein there is a predetermined gap between said restriction means and said armature before said elastic member is fused.

3. An electromagnetic clutch according to claim 1, the movement of said armature being restricted when said restricting means directly contacts said armature without said elastic member being interposed therebetween, when said elastic member is fused.

4. An electromagnetic clutch comprising:
   an electromagnetic coil adapted to be energized for generating an electromagnetic force;
   a rotor rotationally driven by a drive source;
   an armature adapted to be attached to said rotor by the electromagnetic force generated by said electromagnetic coil for receiving the turning effort of said rotor;
   a hub connected to a driven unit;
   spring means connected to said hub;
   a plate connected to said spring means;
   an elastic member bonded to said armature and said plate and interposed between said armature and said plate; and
   restriction means for restricting the movement of said armature in the radial direction thereof when said armature is disconnected with said hub, said restriction means extending axially toward said armature,
   said plate, said elastic member, and said armature being disposed so as to be axially stacked,
   wherein said spring means is connected to said hub by mounting means, and
   wherein the movement of said armature in the radial direction is restricted by keeping a part of said mounting means in contact with said armature.

5. An electromagnetic clutch according to claim 4, wherein there is a predetermined gap between said restriction means and said armature before said elastic member is fused.

6. An electromagnetic clutch according to claim 4, the movement of said armature being restricted when said restricting means directly contacts said armature without said elastic member being interposed therebetween, when said elastic member is fused.

7. An electromagnetic clutch comprising:
   an electromagnetic coil adapted to be energized for generating an electromagnetic force;
   a rotor rotationally driven by a drive source;
   an armature adapted to be attached to said rotor by the electromagnetic force generated by said electromagnetic coil for receiving the turning effort of said rotor;
   a hub connected to a driven unit, the hub having a flange portion;
   spring means connected to said hub;
   a plate connected to said spring means;
   an elastic member bonded to said armature and said plate and interposed between said armature and said plate; and
   restriction means for restricting the movement of said armature in the radial direction thereof when said armature is disconnected with said hub, said restriction means extending axially toward said armature,
   said plate, said elastic member, and said armature being disposed so as to be axially stacked,
   wherein the movement of said armature in the radial direction is restricted by the flange portion of said hub.

8. An electromagnetic clutch according to claim 7 wherein there is a predetermined gap between said restriction means and said armature before said elastic member is fused.

9. An electromagnetic clutch according to claim 7, the movement of said armature being restricted when said restricting means directly contacts said armature without said elastic member being interposed therebetween, when said elastic member is fused.

10. An electromagnetic clutch according to claim 7, wherein the movement of the armature in the radial direction is restricted by bending a flange portion of the hub.

11. An electromagnetic clutch comprising:
    an electromagnetic coil for generating the electromagnetic force upon energization thereof;
    a rotor rotationally driven by a drive source;
    an armature adapted to be attached to said rotor by the electromagnetic force generated by said electromagnetic coil and receiving the turning effort of said rotor;
    a hub connected to a driven unit;
    spring means connected to said hub;
    a plate connected to said hub;
    an elastic member bonded to said armature and said plate and interposed between said armature and said plate; and
    restriction means for restricting the movement of said armature in the axial direction thereof when said armature is disconnected with said hub, said restriction means extending axially toward said armature, said plate, said elastic member, and said armature being disposed so as to be axially stacked, wherein said hub includes a flange portion having an outer diameter larger than the inner diameter of a part of said plate, and wherein the movement of said armature in the axial direction of said hub is restricted by an inner side of said plate being bent to a rear side under the flange portion of the hub.

12. An electromagnetic clutch according to claim 11, wherein there is a predetermined gap between said restriction means and said armature before said elastic member is fused.

13. An electromagnetic clutch according to claim 11, the movement of said armature being restricted when said restricting means directly contacts said armature without said elastic member being interposed therebetween, when said elastic member is fused.

14. An electromagnetic clutch according to claim 11, wherein there is a predetermined gap between said restriction means and said armature before said elastic member is fused.

15. An electromagnetic clutch comprising:
   an electromagnetic coil for generating the electromagnetic force upon energization thereof;
   a rotor rotationally driven by a drive source;
   an armature adapted to be attached to said rotor by the electromagnetic force generated by said electromagnetic coil and receiving the turning effort of said rotor;
   a hub connected to a driven unit;
   spring means connected to said hub;
   a plate connected to said hub;
   an elastic member bonded to said armature and said plate and interposed between said armature and said plate; and
   restriction means for restricting the movement of said armature in the axial direction thereof when said armature is disconnected with said hub, said restriction means extending axially toward said armature,
   said plate, said elastic member, and said armature being disposed so as to be axially stacked,
   wherein said hub includes a flange portion,
   wherein the outer diameter of said flange portion is larger than the inner diameter of said armature, and
   wherein the movement of said armature in the axial direction of said hub is restricted by keeping said flange portion in contact with said inner diameter portion of said armature.

16. An electromagnetic clutch according to claim 15 wherein there is a predetermined gap between said restriction means and said armature before said elastic member is fused.

17. An electromagnetic clutch according to claim 15, the movement of said armature being restricted when said restricting means directly contacts said armature without said elastic member being interposed therebetween, when said elastic member is fused.

* * * * *